(12) United States Patent
Henry et al.

US009951702B2

(10) Patent No.: US 9,951,702 B2
(45) Date of Patent: Apr. 24, 2018

(54) INTERNAL COMBUSTION ENGINE HAVING DEDICATED CYLINDER(S) FOR GENERATION OF BOTH EGR AND EXHAUST AFTERTREATMENT REFORMATE FOR THREE-WAY CATALYST

(71) Applicant: Southwest Research Institute, San Antonio, TX (US)

(72) Inventors: Cary A. Henry, Helotes, TX (US); Terrence F. Alger, San Antonio, TX (US); Jess W. Gingrich, San Antonio, TX (US)

(73) Assignee: SOUTHWEST RESEARCH INSTITUTE, San Antonio, TX (US)

( * ) Notice: Subject to any disclaimer, the term of this patent is extended or adjusted under 35 U.S.C. 154(b) by 119 days.

(21) Appl. No.: 14/538,195

(22) Filed: Nov. 11, 2014

(65) Prior Publication Data
US 2016/0131056 A1    May 12, 2016

(51) Int. Cl.
| *F01N 3/00* | (2006.01) |
| *F02D 41/00* | (2006.01) |
| *F01N 3/10* | (2006.01) |
| *F02D 41/02* | (2006.01) |
| *F02D 41/14* | (2006.01) |
| *F02B 37/18* | (2006.01) |
| *F02M 26/05* | (2016.01) |
| *F02M 26/43* | (2016.01) |
| *F02M 26/19* | (2016.01) |

(52) U.S. Cl.
CPC ......... *F02D 41/0077* (2013.01); *F01N 3/101* (2013.01); *F02B 37/18* (2013.01); *F02D 41/0052* (2013.01); *F02D 41/0082* (2013.01); *F02D 41/025* (2013.01); *F02D 41/1475* (2013.01); *F02M 26/05* (2016.02); *F02M 26/43* (2016.02); *F02M 26/19* (2016.02); *Y02T 10/144* (2013.01); *Y02T 10/22* (2013.01); *Y02T 10/26* (2013.01); *Y02T 10/47* (2013.01)

(58) Field of Classification Search
CPC ............... F02D 41/0077; F02D 41/025; F02D 41/0082; F02D 41/008; F02M 26/44; Y02T 10/22
See application file for complete search history.

(56) References Cited

U.S. PATENT DOCUMENTS

| 6,073,600 | A | * | 6/2000 | Ma | ........................... F02B 17/00 123/184.43 |
| 7,945,376 | B2 | * | 5/2011 | Geyer | ..................... F02M 26/39 123/568.21 |
| 8,291,891 | B2 | | 10/2012 | Alger, II | |
| 8,490,387 | B2 | | 7/2013 | Schreiber | |
| 8,561,599 | B2 | | 10/2013 | Gingrich | |
| 9,297,320 | B2 | * | 3/2016 | Hilditch | ................. F02M 26/16 |
| 2012/0204844 | A1 | | 8/2012 | Gingrich | |
| 2013/0220286 | A1 | | 8/2013 | Gingrich | |
| 2014/0142833 | A1 | | 5/2014 | Gingrich | |
| 2015/0260128 | A1 | * | 9/2015 | Roth | ...................... F01L 1/3442 123/568.13 |

* cited by examiner

*Primary Examiner* — Mark Laurenzi
*Assistant Examiner* — Jason Sheppard
(74) *Attorney, Agent, or Firm* — Livingston Law Firm

(57) ABSTRACT

An exhaust gas recirculation (EGR) system for an internal combustion engine having dedicated EGR and operating at a net stoichiometric air-fuel ratio. In such engines, one or more cylinders is operable as a dedicated EGR cylinder, such that all of the exhaust produced by the dedicated EGR cylinder(s) may be directed back to the intake manifold. Because the engine's exhaust is net stoichiometric, its exhaust aftertreatment system has a three-way catalyst. An EGR loop is configured to recirculate EGR from the dedicated EGR cylinder(s) to the engine's intake manifold. A diversion line, modulated with a valve, connects the EGR loop to the exhaust aftertreatment system, thereby allowing adjustment of the relative amounts of EGR to be recirculated and to be provided to the exhaust system.

5 Claims, 3 Drawing Sheets

INTERNAL COMBUSTION ENGINE HAVING DEDICATED CYLINDER(S) FOR GENERATION OF BOTH EGR AND EXHAUST AFTERTREATMENT REFORMATE FOR THREE-WAY CATALYST

TECHNICAL FIELD OF THE INVENTION

This invention relates to internal combustion engines, and more particularly to such engines having one or more cylinders dedicated to production of recirculated exhaust.

BACKGROUND OF THE INVENTION

In an internal combustion engine system having dedicated EGR (exhaust gas recirculation), one or more cylinders of the engine are segregated and dedicated to operate in a rich combustion mode. As a result of the rich combustion, the exhaust gases from the dedicated cylinder(s) include hydrogen and carbon monoxide. Rich combustion products such as these are often termed "syngas".

Dedicated EGR engines use the syngas produced by the dedicated cylinder(s) in an exhaust gas recirculation (EGR) system. The hydrogen-rich syngas is ingested into the engine for subsequent combustion by the non-dedicated cylinders and optionally by the dedicated cylinder(s). Benefits of combustion with dedicated EGR are numerous, but include engine efficiency improvements and emissions improvements (reduction of NOx, carbon monoxide and particulate matter).

Dedicated EGR has been successfully used with engines that operate with stoichiometric combustion in the non-dedicated cylinders, whose exhaust exits into the exhaust treatment system of the engine. The stoichiometric exhaust allows very effective use of traditional three-way catalyst technology for emissions reductions.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

The following description is directed to various systems and methods for a dedicated EGR system installed in a vehicle, such as an automobile, that also has an exhaust aftertreatment system. As explained below, the internal combustion engine is normally operated to provide "net stoichiometric" exhaust, which allows the exhaust aftertreatment system to successfully treat the exhaust with a conventional three-way catalyst.

In the non-conventional embodiments of this description, the dedicated EGR system has one or more dedicated EGR cylinders, which are normally operated rich to produce hydrogen-rich "syngas", also referred to here as "EGR" and "reformate". This EGR gas stream can be divided into two portions. One portion is used as EGR to improve engine efficiency and emissions, in a manner analogous to dedicated EGR for stoichiometric engines. The second portion is used as a rich reformate for an exhaust aftertreatment system having a three-way catalyst.

Conventional Dedicated EGR System (Prior Art)

Figure 1:
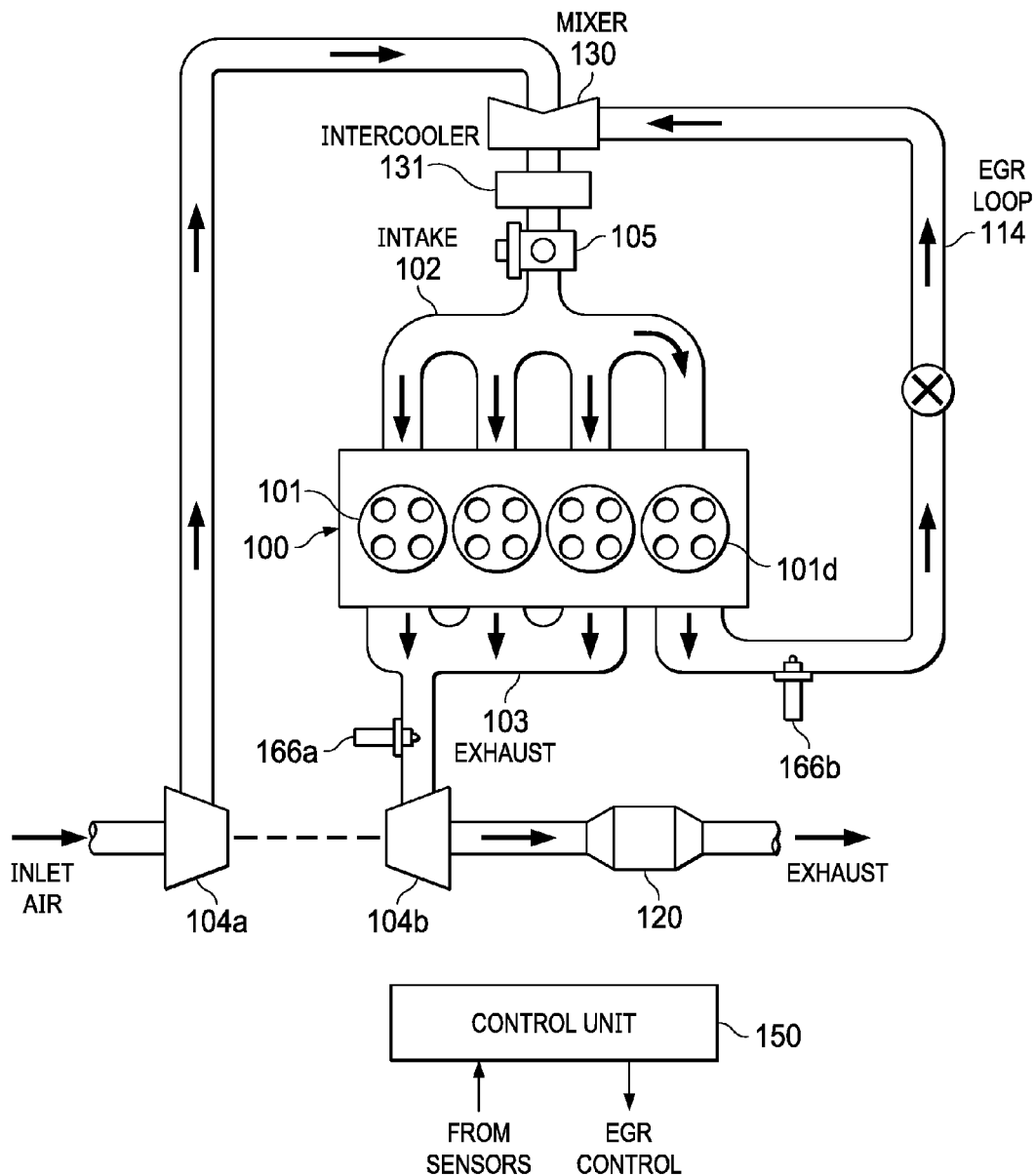
FIG. 1 illustrates a dedicated EGR system installed in a stoichiometric engine system, with EGR being used for only recirculation.

FIG. 1 illustrates an internal combustion engine 100 having four cylinders 101. One of the cylinders is a dedicated EGR cylinder, and is identified as cylinder 101d. In the example of FIG. 1, engine 100 is gasoline-fueled and spark-ignited, with each cylinder 101 having an associated spark plug.

The dedicated EGR cylinder 101d may be operated at any desired air-fuel ratio. All of its exhaust is recirculated back to the intake manifold 102.

In the embodiment of FIG. 1, the other three cylinders 101 (referred to herein as the "main" or "non dedicated" cylinders) are operated at a stoichiometric air-fuel ratio. Their exhaust is directed to an exhaust aftertreatment system via an exhaust manifold 103.

Engine 100 is equipped with a turbocharger, specifically a compressor 104a and a turbine 104b. Although not explicitly shown, the cylinders have some sort of fuel delivery system for introducing fuel into the cylinders. This main fuel delivery system can be fumigated, port injected, or direct injected.

In the example of this description, the EGR loop 114 joins the intake line downstream the compressor 104a. A mixer 130 mixes the fresh air intake with the EGR gas, and an intercooler 131 cools the mixture. A throttle 105 is used to control the amount of intake (fresh air and EGR) into the intake manifold 102.

An EGR valve (not shown) may be used to control the EGR intake into the intake manifold 102. Alternatively, other means, such as variable valve timing, may be used to control EGR flow.

In other embodiments, there may be a different number of engine cylinders 101, and/or there may be more than one dedicated EGR cylinder 101d. In general, in a dedicated EGR engine configuration, the exhaust of a sub-group of cylinders is routed back to the intake of all the cylinders, thereby providing EGR for all cylinders. In some embodiments, the EGR may be routed to only the main cylinders.

After entering the cylinders 101, the fresh-air/EGR mixture is ignited and combusts. After combustion, exhaust gas from each cylinder 101 flows through its exhaust port and into exhaust manifold 103. From the exhaust manifold 103, exhaust gas then flows through turbine 104b, which drives compressor 104a. After turbine 104b, exhaust gas flows to an three-way catalyst 120, to be treated before exiting to the atmosphere.

As stated above, the dedicated EGR cylinder 101d can operate at any equivalence ratio because its exhaust will not exit the engine before passing through a non-dedicated EGR cylinder 101 operating at a stoichiometric air-fuel ratio. Because only stoichiometric exhaust leaves the engine, the exhaust aftertreatment device 120 may be a three-way catalyst.

To control the air-fuel ratio, exhaust gas may be sampled by an exhaust gas oxygen (EGO) sensor. Both the main exhaust line 122 and the EGR loop 114 may have a sensor (identified as 166a and 166b), particularly because the dedicated EGR cylinder may be operated at a different air-fuel ratio than non dedicated cylinders.

If a dedicated EGR cylinder is run rich of stoichiometric A/F ratio, a significant amount of hydrogen (H2) and carbon monoxide (CO) may be formed. In many engine control strategies, this enhanced EGR is used to increase EGR tolerance by increasing burn rates, increasing the dilution limits of the mixture and reducing quench distances. In addition, the engine may perform better at knock limited conditions, such as improving low speed peak torque results, due to increased EGR tolerance and the knock resistance provided by hydrogen (H2) and carbon monoxide (CO).

An EGR control unit 150 has appropriate hardware (processing and memory devices) and programming for controlling the EGR system. It receives data from the sensors described above, and performs various EGR control algorithms. It then generates control signals to the various valves and other actuators of the EGR system.

Dedicated EGR System with Low Pressure Syngas Diversion to Main Exhaust Line

Figure 2:
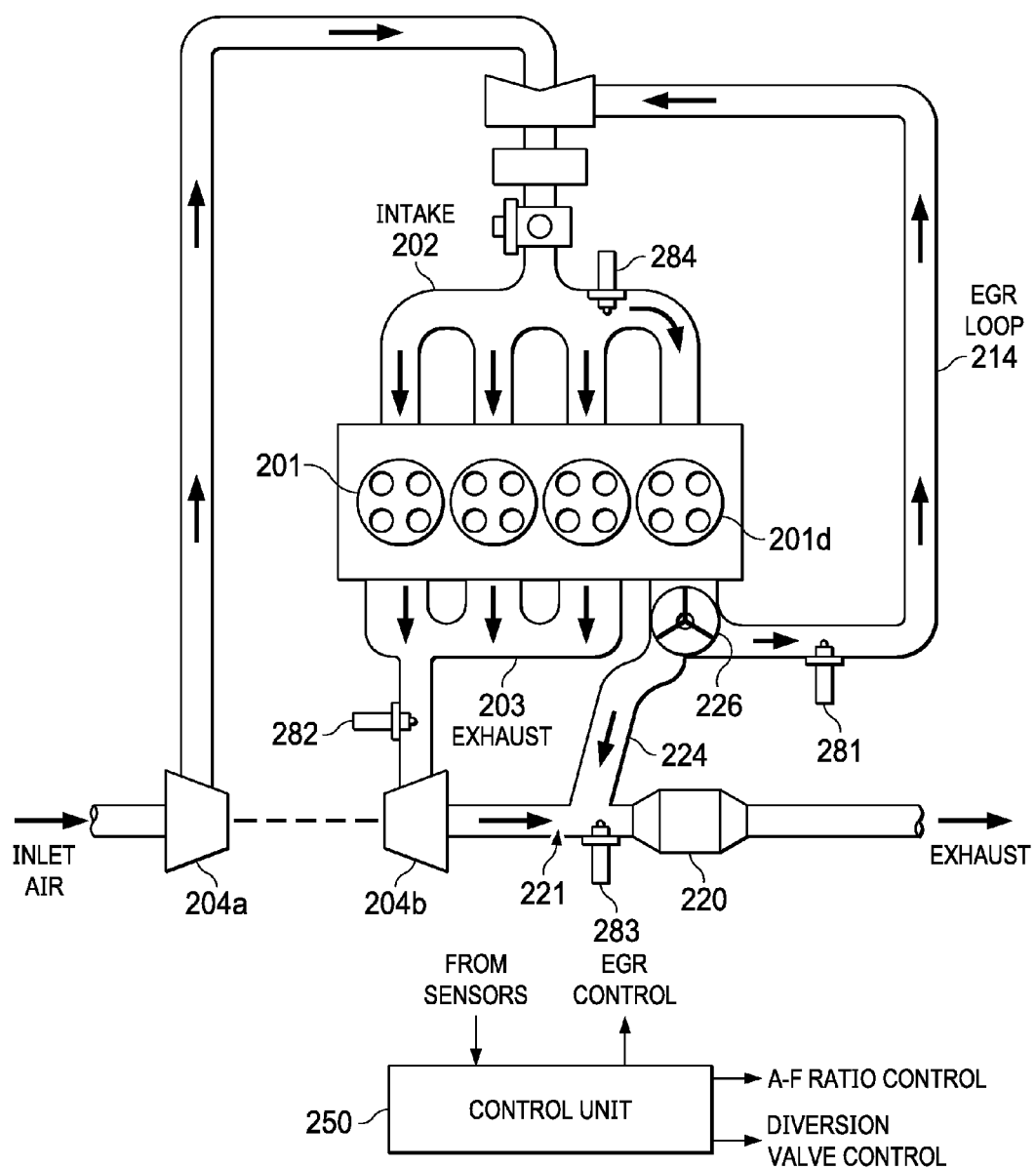
FIG. 2 illustrates a dedicated EGR system like that of FIG. 1, but modified with a diversion line from the EGR loop to the main exhaust line.

FIG. 2 illustrates an EGR system configured for division of the dedicated EGR flow between an EGR loop and the exhaust stream. The system of FIG. 2 uses a three-way catalyst, and may be generally described as a "net stoichiometric" system.

The main cylinders 201 are operated with an air-fuel ratio that may vary from stoichiometric, and in particular, may be operated lean in certain operating conditions. However, if the dedicated EGR cylinder is operated rich and its output is added to the exhaust as syngas, the total exhaust stream (from the dedicated and main cylinders) can be made to be "net stoichiometric".

This balancing of exhaust streams to produce net stoichiometric exhaust can be used at all engine operating conditions, but is expected to be most advantageous at light loads or to enhance catalyst light-off. Under various engine operating conditions, the balancing can be used to ensure stable combustion in the main cylinders when there is a reduced EGR fraction.

In various respects, the EGR system is similar to that of FIG. 1. Engine 200 has one dedicated EGR cylinder 201d and three main cylinders 201. It has a compressor 204a and turbine 204b for providing charged intake to the intake manifold 202.

An exhaust manifold 203 delivers lean exhaust to an exhaust aftertreatment system. Because engine 200 typically operates with a net stoichiometric air-fuel ratio, the exhaust aftertreatment system may be implemented with a three-way catalyst 220.

As in the example of FIG. 1, the dedicated EGR cylinder 201d is run at a rich air-fuel ratio. The air-fuel ratio for cylinder 201d is selected for the result of providing desired amounts of CO and H2 syngas (reformate), as well as to maintain net stoichiometric conditions in the exhaust stream ahead of the three-way catalyst. The air-fuel ratio may vary, that is, the dedicated EGR cylinder may be operated at different levels of "richness" or at any other air-fuel ratio.

The syngas generated by the dedicated EGR cylinder 201 is directed back to all cylinders 201 via an EGR loop 214. The operation and configuration of the EGR loop 214 is essentially the same as that of EGR loop 114 described above in connection with FIG. 1.

However, one modification to the EGR loop 214 is the diversion of a portion of the syngas to the exhaust aftertreatment system. A syngas supply line 224 connects the EGR loop 214 to the main exhaust line 221 at a point downstream of turbine 204b and upstream of the three-way catalyst 220. As a result, syngas from the dedicated EGR cylinder 201d may flow directly into the main exhaust line 221 at a point upstream three-way catalyst 220. The catalyst 220 uses the syngas as a reductant in treating exhaust. The treated exhaust is then expelled into the atmosphere via the tailpipe.

In the system of FIG. 2, the syngas stream is routed from a point on the EGR loop 214 that is near the exhaust manifold 203 directly to the main exhaust line 221. The syngas is metered by valve 226 and delivered directly from the dedicated EGR cylinder 201d into the exhaust stream. The delivery point is downstream of turbine 204b and upstream of the three-way catalyst 220.

A three-way valve 226 is installed on the syngas supply line 224. Valve 226 is a fully proportional three-way valve. Numerous types of these valves are known to those skilled in the art, and can be used for this purpose. By "fully proportional" is meant that valve 226 can divide the flow of EGR from dedicated cylinder 201d into whatever relative amounts are desired, divided between the recirculation stream and the exhaust aftertreatment stream.

Thus, valve 226 proportionally controls the flow of EGR from dedicated EGR cylinder 201d, such that the EGR flow is simultaneously divided between two gas streams. One stream is recirculated to the intake manifold 202, and one stream is delivered to the exhaust aftertreatment system. The relative amount of flow in the two streams depends on various engine operating conditions.

Oxygen detection sensors 281, 282 and 283 can be used in the EGR loop, exhaust manifold, and between the syngas injection site and three-way catalyst 220, respectively, to quantify the amount of syngas being metered into the exhaust stream. An additional oxygen sensor 284 can be used in the intake manifold 202 to quantify the EGR fraction routed to the intake manifold.

A control unit 250 performs the same EGR control functions as described above for control unit 150. In addition, control unit 250 generates and delivers control signals to the actuator of valve 226, to modulate the flow of EGR (syngas) between the two streams. It also receives O2 measurement data from the various O2 sensors, and has appropriate software and hardware to perform the control operations described below.

In operation, by proportionally controlling the EGR stream to the intake manifold 202, the amount of EGR present in the intake charge stream can be reduced for light load operating conditions. This reduction in the EGR intake fraction can improve combustion stability of the engine. This improvement in combustion stability improves fuel utilization in-cylinder, but excess fuel is now present in the exhaust stream. In order to use this fuel efficiently, and improve fuel consumption of the engine system, the main cylinders 201 can be operated net lean. Although this may result in increased NOx in the exhaust, the syngas provided to the aftertreatment system can be used to reduce NOx emissions on the three-way catalyst. Control unit 250 may be programmed to both adjust valve 226 and to adjust the air-fuel ratio of the main cylinders 201.

The above-described operation is especially useful in light load engine operating conditions. The air-fuel ratio of the main cylinders can be lean, with the air-fuel ratio of the dedicated cylinder rich, with the exhaust from the dedicated cylinder injected in the main exhaust line to provide "net stoichiometric" exhaust.

Catalyst light off for catalyst 220 can be optimized with a similar balancing of the relative air-fuel ratios of the main and dedicated cylinders. The richness of the dedicated EGR cylinder is balanced with the leanness of the main cylinders to minimize light-off time during cold start engine operating conditions.

Thus, the use of syngas diversion line 224 to inject syngas (as exhaust reformate) directly into the exhaust stream can improve time-to-operation of the exhaust aftertreatment system. Similar to the benefit of syngas in the combustion chamber with respect to burning velocity, syngas has a lower activation energy for oxidation. The syngas promotes rapid warm-up of the catalyst 220.

Control unit 250 is programmed for EGR control as described above. In addition, it may store and execute programming for various engine control strategies that balance the air-fuel ratio of the main cylinders vis-a-vis the air-fuel ratio of the dedicated cylinder, as well as the relative proportion of EGR delivered to EGR loop and the main exhaust line, during various engine operating conditions. Both the proportional control of EGR and the richness of the EGR can be adjusted to provide net stoichiometric exhaust.

Control unit 250 may be a part of a larger engine control unit such that it controls the air-fuel ratios for all cylinders. Alternatively, control unit 250 may cooperate with a different control unit, and be responsible for only the EGR system and the dedicated EGR cylinder(s).

Dedicated EGR System with High Pressure Syngas Diversion to Exhaust Manifold

Figure 3:
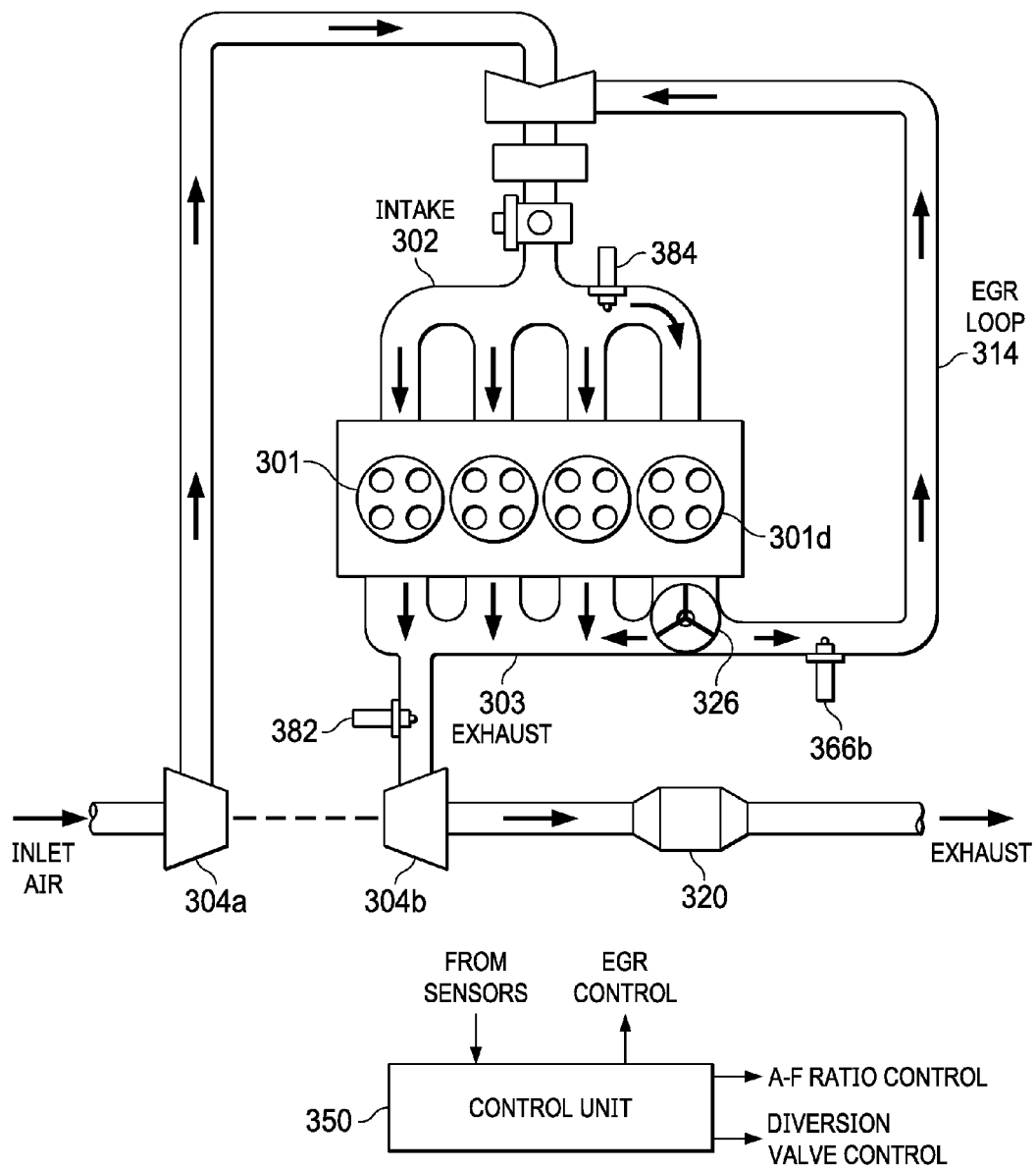
FIG. 3 illustrates a dedicated EGR system like that of FIG. 1, but modified with a diversion line from the EGR loop to the exhaust manifold.

FIG. 3 illustrates another embodiment of a dedicated EGR system configured for division of the dedicated EGR flow between an EGR loop and the exhaust stream. In various respects, the EGR system is similar to that of FIGS. 1 and 2. Engine 300 has one dedicated EGR cylinder 301d and three main cylinders 301. It has a compressor 304a and turbine 304b for providing charged intake to the intake manifold 302.

An exhaust manifold 303 delivers exhaust to an exhaust aftertreatment system. Because engine 300 normally operates with a stoichiometric air-fuel ratio, the exhaust aftertreatment system may be implemented with a three-way catalyst 320.

As in the example of FIG. 1, the dedicated EGR cylinder 301d is typically run at a rich air-fuel ratio. The air-fuel ratio for cylinder 301d is selected for the result of providing desired amounts of CO and H2 syngas.

The syngas generated by the dedicated EGR cylinder 301 is directed back to the intake manifold 302 via an EGR loop 314. The operation and configuration of the EGR loop 314 is essentially the same as that of EGR loops 114 and 214 described above in connection with FIGS. 1 and 2.

However, in the system of FIG. 3, syngas (reformate) may be supplied directly from the EGR loop 314 into the exhaust manifold 303. A proportional three-way valve 326 is installed such that syngas is directed to the EGR recirculation stream and/or directly into the exhaust manifold 303.

In operation, the EGR fraction in the intake stream is quantified using an oxygen sensor 384 in the intake manifold 302. The proportion of EGR (syngas) delivered to the exhaust stream can be calculated from the known amount of syngas present in the intake manifold. A single oxygen sensor 382 in the exhaust manifold 303 can then be used to control the air-fuel ratio of all cylinders 210 to achieve net stoichiometric exhaust, with the main cylinders 201 operating net lean for fuel economy improvement.

Control unit 350 is programmed to control the EGR system in the manner described above in connection with FIG. 2. It controls valve 326 to adjust the relative amounts of flow in the two EGR paths. In the manner described above in connection with FIG. 2, during light load or cold start conditions, control unit 350 can be programmed to lessen the amount of EGR to be recirculated (increase the amount of EGR to the exhaust aftertreatment system). The relative amounts of syngas to each path (recirculation or exhaust) can be adjusted, as can the air-fuel ratio to maintain a desired net stoichiometric condition of the exhaust. Control unit 350 receives oxygen measurements from sensors 384 and 382, and determines air-fuel ratios for each cylinder 301.

The embodiment of FIG. 3 uses turbine 304b to mix the syngas with the exhaust stream. This results in good syngas distribution upstream of the three-way catalyst 320.

What is claimed is:

1. A method of using an exhaust gas recirculation (EGR) system for an internal combustion engine having a number of cylinders and having an exhaust aftertreatment system with a three-way catalyst, comprising:

operating one or more cylinders as a dedicated EGR cylinder, such that all of the exhaust produced by the dedicated EGR cylinder(s) may be recirculated to the engine's main (non dedicated) cylinders;

operating the dedicated EGR cylinder(s) at a more rich air-fuel ratio than the main cylinders;

providing an EGR loop for recirculating EGR from the dedicated EGR cylinder(s) to the engine's intake manifold;

connecting the EGR loop to the exhaust aftertreatment system, delivering all or a portion of exhaust from the dedicated EGR cylinder(s) as syngas to the three-way catalyst;

for all operating conditions of the engine, determining a ratio of recirculated EGR to syngas that will optimize combustion stability of the main cylinders, thereby determining a set of optimum EGR ratios associated with all engine operating conditions;

at all engine operating conditions and based on an associated optimum EGR ratio, modulating relative amounts of flow of syngas to be recirculated and relative amounts of flow of syngas to be delivered to the three-way catalyst;

controlling an air-fuel ratio of the main cylinders and an air-fuel ratio of the dedicated EGR cylinder(s) such that a mixture of exhaust from the main cylinders and the EGR delivered as syngas to the three-way catalyst is always stoichiometric during all operation of the engine.

2. The system of claim 1, wherein the engine is equipped with a turbine and wherein the exhaust aftertreatment system has a main exhaust line from which exhaust from the main cylinders exits the turbine, and wherein the connected step is performed with a diversion line that joins a main exhaust line downstream of the turbine.

3. An exhaust gas recirculation (EGR) system for a stoichiometric internal combustion engine having a number of cylinders and having an intake manifold, an exhaust manifold, and an exhaust aftertreatment system with a three-way catalyst, comprising:

one or more cylinders that operate as a dedicated EGR cylinder, such that all of the exhaust produced by the dedicated EGR cylinder(s) may be recirculated to the engine's main (non dedicated) cylinders, and that further operate at a more rich air-fuel ratio than the main cylinders;

wherein the dedicated EGR cylinder(s) and the main cylinders each have an exhaust port to the same exhaust manifold;

an EGR loop for recirculating EGR from the dedicated EGR cylinder(s) to the engine's intake manifold;

a three-way valve configured to provide direct fluid communication from the exhaust port of the dedicated EGR cylinder(s) to either or both the exhaust manifold and the EGR loop;

wherein the three-way valve is operable to modulate relative amounts of flow of syngas to be recirculated and relative amounts of flow of syngas to be delivered to the exhaust manifold;

a first oxygen sensor to measure oxygen in the intake manifold;

a second oxygen sensor to measure oxygen in the exhaust manifold;

a control unit, comprising a processor and memory, that performs the following tasks: based on data from only the first oxygen sensor, estimates the air-fuel ratio of intake to all cylinders; based on data from only the second oxygen sensor, estimates the air-fuel ratio of exhaust from all cylinders; controls an amount of flow of syngas to be recirculated to the intake manifold relative to an amount of flow of syngas to be delivered to the three-way catalyst; controls an air-fuel ratio of the main cylinders and an air-fuel ratio of the dedicated EGR cylinder(s) such that a mixture of exhaust from the main cylinders and the EGR delivered as syngas to the three-way catalyst is stoichiometric during all operation of the engine.

4. A method of using an exhaust gas recirculation (EGR) system for an internal combustion engine, the engine having an intake manifold, a number of cylinders and being equipped with an exhaust aftertreatment system with a three-way catalyst installed on a main exhaust line, comprising:

operating one or more cylinders as a dedicated EGR cylinder, such that all of the exhaust produced by the dedicated EGR cylinder(s) may be recirculated to the engine's main (non dedicated) cylinders;

further operating the dedicated EGR cylinder(s) with a more rich air-fuel ratio than the main cylinders;

providing an EGR loop for recirculating EGR from the dedicated EGR cylinder(s) to the engine's intake manifold;

connecting the EGR loop to the exhaust manifold, via a three-way valve, such that all cylinders share a common exhaust manifold;

using the three-way valve to control the relative amounts of EGR delivered to the exhaust manifold versus the EGR loop;

estimating the air-fuel ratio of the combined exhaust from the dedicated EGR cylinder(s) and the main cylinders, using a single oxygen sensor in the exhaust manifold;

controlling an air-fuel ratio of the main cylinders and an air-fuel ratio of the dedicated EGR cylinder(s) such that a mixture of exhaust from the main cylinders and the EGR delivered as syngas to the three-way catalyst is stoichiometric during all operation of the engine;

during light load and cold start conditions of the engine, decreasing an amount of EGR delivered to the intake manifold, and operating the main cylinders more lean such that a mixture of exhaust from the main cylinders and the EGR delivered as syngas to the three-way catalyst remains stoichiometric.

5. The method of claim 4, further comprising using an oxygen sensor in the exhaust manifold to determine whether the exhaust to the three way catalyst is stoichiometric.

\* \* \* \* \*